O. P. IVES.
Car Coupling.
No. 103,748. Patented May 31, 1870.
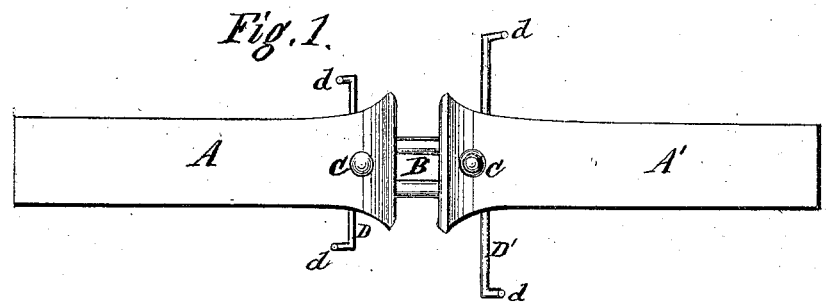
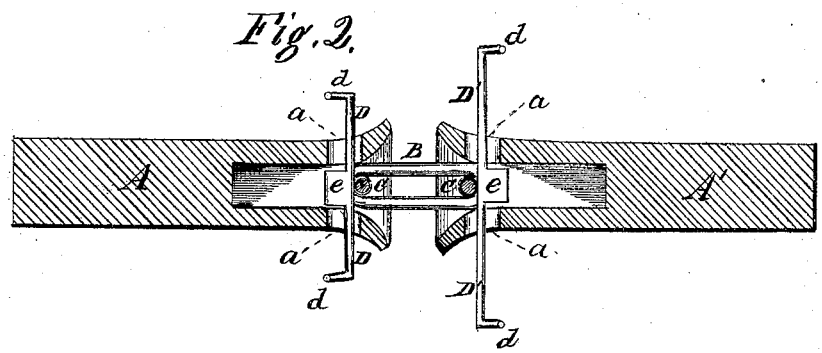
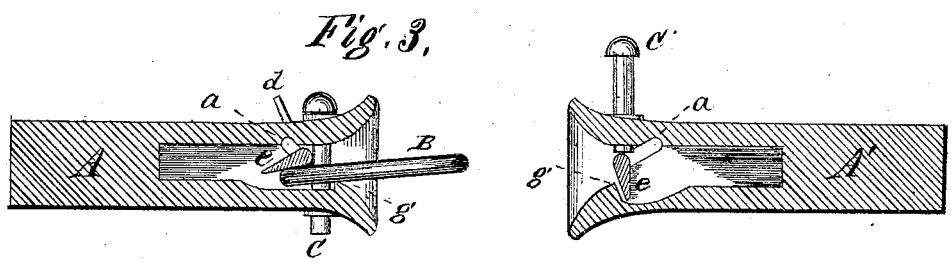
WITNESSES.
Wm. F. Dodge
Saml. Duncan
INVENTOR.
O. P. Ives
per H. A. Morley &c.
Atty.
N. PETERS, PHOTO-LITHOGRAPHER, WASHINGTON, D. C.

UNITED STATES PATENT OFFICE.

OLIVER P. IVES, OF SYRACUSE, NEW YORK.

IMPROVEMENT IN CAR-COUPLINGS.

Specification forming part of Letters Patent No. 103,748, dated May 31, 1870.

*To all whom it may concern:*

Be it known that I, OLIVER P. IVES, of Syracuse, in the county of Onondaga and State of New York, have invented a new and useful Improvement in Car-Couplings; and I do hereby declare that the following is a full, clear, and exact description thereof, which will enable those skilled in the art to make and use the same, reference being had to the accompanying drawings, forming part of this specification, in which—

Figure 1 is a plan view of my invention. Fig. 2 is a horizontal section. Fig. 3 is a vertical section, and Figs. 4 and 5 are detail views.

Similar letters of reference indicate like parts in the several figures.

The object of this invention is to provide a simple means for guiding the coupling-link into the opposite bumper or draw-bar, and for dropping the coupling-pin without danger to the operator, as hereinafter described.

In the accompanying drawings, A A' are the draw-bars. B is the coupling-link, and C C are the coupling-pins. The link-recess in each draw-bar is made roomy, as shown in Figs. 2 and 3, and in the opposite sides of each bar is an inclined slot, $a$, Figs. 2, 3, and 4. I provide a rod, D, Fig. 5, having an arm or handle, $d$, at each end, and having at its center a projection or apron, $e$. I place one of these rods D transversely in each draw-bar, so that the rod D on each side of the apron $e$ shall occupy or pass outward through the inclined slots $a$ in the draw-bar, the apron $e$ occupying the main recess between said slots $a$, as shown in Fig. 2.

Its operation is as follows: The coupling-pin C', Fig. 2, is raised, as shown, and this allows the rod D to fall to the bottom of the inclined slots $a a$, and the pin is then supported in that position by resting upon the back of the apron $e$. The operator or attendant then seizes one of the handles $d$ of the draw-bar A, and by raising or depressing said handle guides the link B into the draw-bar A', and as the link enters said bar A' it encounters the apron $e$ and pushes it back from under the pin C', and said pin falls into the coupled position. The recess of each draw-bar is made with a shoulder, $g$, Fig. 3, upon which the link B is balanced by the apron $e$, so that the outward end of the link is readily elevated or lowered by the action of the apron $e$ under the control of the attendant.

The rods D D' in Figs. 1 and 2 are of different lengths, the short rod, D, being designed for coaches or passenger-cars, and usually operated from the platform of the car, and the long rods, D', are designed for freight-cars, and by making them of suitable length the attendant can reach them and avoid all danger in coupling by the cars coming together, and in no case is it necessary for the operator or attendant to place his hand between the approaching draw-bars to guide the link. But one handle, $d$, is necessary when the coupling is done from the platform of a car; but one or two handles can be used.

This device adds but very little to the cost of the bumpers or draw-bars, and cars to which it is applied connect readily with the ordinary draw-bar, so that its simultaneous application to all the cars of a road is not necessary.

Having thus described my invention, what I claim as new is—

The combination of the inclined slots $a a$ and the rod D, having projection $e$ and handles $d d$, all arranged as described with relation to the shoulder $g$, pin C', and link B, and operating as and for the purposes herein set forth.

The above specification of my invention signed by me this 14th day of March, 1870.

O. P. IVES.

Witnesses:
 WM. J. DODGE,
 F. A. MORLEY.